Dec. 8, 1953     A. ATTENHOFER     2,661,957
SKI-FASTENING DEVICE
Filed May 23, 1952
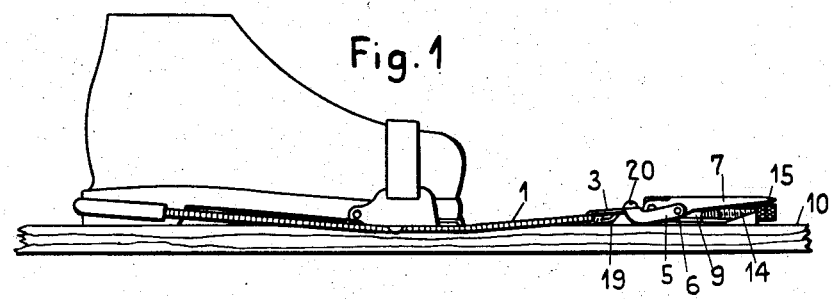
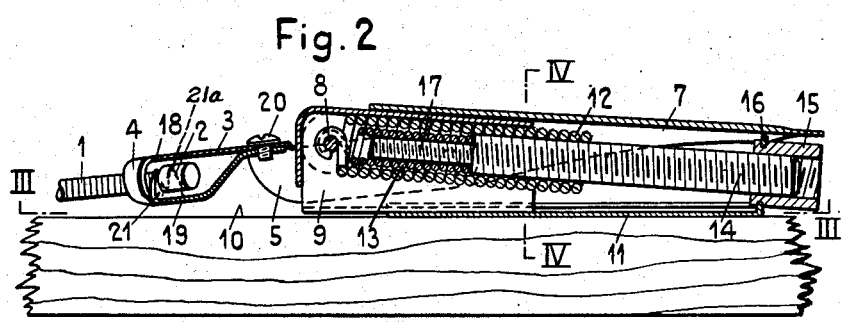
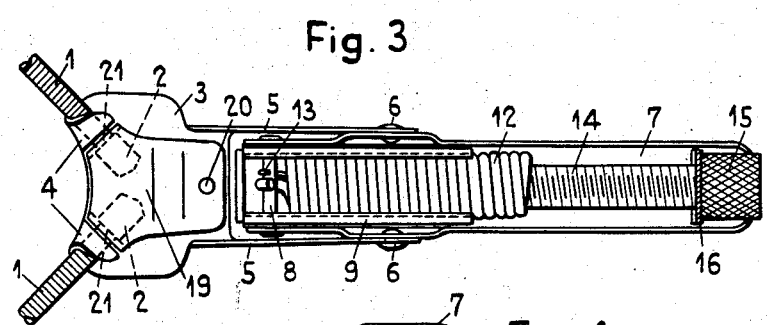
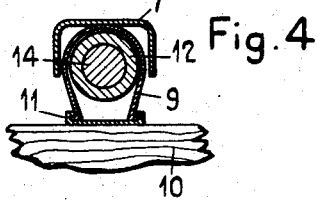
Inventor
Adolf Attenhofer
By
Singer, Stern & Carlberg
attys Patented Dec. 8, 1953

2,661,957

UNITED STATES PATENT OFFICE 2,661,957

SKI-FASTENING DEVICE

Adolf Attenhofer, Zurich, Switzerland

Application May 23, 1952, Serial No. 289,573

3 Claims. (Cl. 280—11.35)

The invention relates to a ski-fastening device having a cable loop detachably hooked to a toggle lever arranged at its front, with a spring interposed between the toggle lever and the said cable loop.

It is a main object of the invention to provide a ski-fastening device of the kind referred to which secures the boot of the ski-runner safely in the attachment while at the same time offering satisfactory resiliency.

It is another object of the invention to provide a ski-fastening device offering an increased downward pull which complies with all requirements.

It is yet another object of the invention to provide a ski equipped with a ski-fastening device offering the advantages mentioned hereinabove.

With these and other objects in view I provide a ski-fastening device comprising in combination: a longitudinal guide member adapted to be fixed to the top surface of the ski, a slide shiftably guided on the said guide member, a toggle lever pivoted to the said slide about a transverse axis, a cable loop attached to the said toggle lever, and at least one spring connected between the said guide member and the said toggle lever.

Preferably an adjustment screw is arranged which controls the stressing of the said spring. In a preferred embodiment, an adjustment nut is journalled rotatably and restrained axially in the said guide member, a threaded bolt is screwed into the said nut, and a coiled tension spring is provided having a helical pitch and an inner diameter matching the helical pitch and outer diameter of the said threaded bolt and in screw connection therewith at one end, the other end of the said spring being attached to the said toggle lever.

In order to attain a particularly desirable spring characteristic, one may provide a bolt having a threaded large diameter portion at one end in screwed connection with the said nut, and a threaded small diameter portion at the other end, and two concentrical coiled tension springs each having a helical pitch and inner diameter matching the helical pitch and outer diameter of the said threaded large diameter portion and threaded small diameter portion, respectively, and in screwed connection with these portions at one end, respectively, the other ends of the said springs being attached to the said toggle lever.

Between the said toggle lever and the said cable loop there may be interposed an attachment member which is articulated to the said toggle lever and which, with upturned projections, embraces the ends of said cable loop behind ferrules fixedly attached to the said ends.

A safety member may be attached detachably to the said attachment member and may, with upturned lugs, engage between the said upturned projections of the attachment member and the said ferrules at the ends of the said cable loop. In the preferred form, the said attachment member has a plate portion, at the rear corners of which the said upturned projections are arranged, and the said safety plate is attached to the said plate portion, the lugs of the said safety plate having slots open towards the said attachment plate.

Further objects and features of the invention will become apparent from the description of a preferred embodiment given by way of example with reference to the accompanying drawing. And while I describe and illustrate what may be considered as typical for the invention, I wish it to be understood that I do not limit myself to the particular details and dimensions illustrated and described, for obvious modifications will occur to a person skilled in the art according to the conditions and circumstances in which my said invention is to be applied.

In the accompanying drawings:

Fig. 1 is a lateral elevation of a fastening mounted on to a ski in the operative position, Fig. 2 is a longitudinal section through the toggle lever device on a larger scale, and Figs. 3 and 4 are sections along the lines III—III and IV—IV of Fig 2, respectively.

The ski fastening shown comprises a cable loop 1. The free ends of the cable are provided with pressed-on ferrules 2 which can be hooked into an attachment member 3. The attachment member has for this purpose lugs 4 embracing the cable. The attachment member 3 is linked by means of arms 5 and of rivets 6 to a toggle lever 7 which in turn is pivoted about a pin 8. As will be seen in Figs. 2, 3, the bolt 8 is attached to a slide 9 which is shiftably guided on a guide member 11 fixed to the top face of the ski 10. The abutment of the slide 9 on the guide member 11 is effected by means of two concentrically telescoped springs 12, 13 which on the one hand are anchored on the pin 8 and, on the other hand are coiled about a threaded spindle 14.

This threaded spindle carries at its end a knurled nut 15 which abuts on the stop 16 turned up vertically from the guide member 11. The nut 15 of the threaded spindle 14 can be turned, but the said nut is restrained against shifting by the stop 16. By turning the nut 15 accordingly the prestressing of the spring 12 coiled about the spindle 14, and thereby the effective length of the cable 1 can be adjusted. The pre-stressing of the spring 13 which has a smaller diameter, is varied at the same time thereby that this spring engages with a hook-shaped end the pin 8 and, on the other hand, is coiled about a portion 17 of the spindle 14 which has a smaller diameter.

The attachment member is moreover so constructed that, although the cable loop can be easily exchanged, the latter is yet reliably secured to the fastening. As mentioned hereinabove, lugs 4 of the attachment member 3 embrace the ends of the cable behind the pressed-on ferrules 2. The free ends of the lugs terminate, however, at a distance from the rear portion 18 of the attachment member, so that the cable ends can be inserted and taken out without difficulty. In order to secure the same, a safety plate 19 is provided which is secured to the attachment member by means of a screw 20. This safety plate 19 engages behind the ferrules 2 with its lugs 21 which lugs have slots 21a the width of which exceeds but little the diameter of the steel cable. After the loop 20 has been loosened and the safety plate 19 has been removed the exchanging of the cable loop is readily possible.

Instead of the knurled nut 15 being passed through the stop 16 which latter embraces the nut as shown in Fig. 2, it is possible merely to guide the nut 15 with a neck-shaped recess in a mortise joint which is open on top, and to restrain the same from axial displacement.

Of course, in connection with the toggle lever device as described, means can be provided for securing or effecting a diagonal pull.

The embodiment shown in the drawing having two springs 12 and 13 has proved particularly successful.

What I claim as my invention and desire to secure by Letters Patent, is:

1. A ski-fastening device comprising in combination: a longitudinal guide member adapted to be fixed to the top surface of the ski, a slide shiftably guided on the said guide member, a toggle lever pivoted to the said slide about a transverse axis, a cable loop attached to the said toggle lever, an adjustment nut journalled rotatably and restrained axially in the said guide member, a bolt having a threaded large diameter portion at one end in screwed connection with the said nut and a threaded small diameter portion at the other end, and two concentrical coiled tension springs each having a helical pitch and inner diameter matching the helical pitch and outer diameter of the said threaded large diameter portion and threaded small diameter portion, respectively, and in screwed connection with these portions at one end, respectively, the other ends of the said spring being attached to the said toggle lever.

2. A ski-fastening device comprising in combination: a longitudinal guide member adapted to be fixed to the top surface of the ski, a slide shiftably guided on the said guide member, a toggle lever pivoted to the said slide about a transverse axis, at least one spring connected between the said guide member and the said toggle lever, an attachment member articulated to the said toggle lever, a cable loop, ferrules fixedly attached to the ends of the said cable loop, and a safety plate detachably attached to the said attachment member, the said attachment with upturned projections embracing the ends of the said cable and engaging behind the said ferrules, and the said safety plate engaging with upturned lugs between the said ferrules and the said projections of the said attachment plate.

3. A ski-fastening device comprising in combination: a longitudinal guide member adapted to be fixed to the top surface of the ski, a slide shiftably guided on the said guide member, a toggle lever pivoted to the said slide about a transverse axis, at least one spring connected between the said guide member and the said toggle lever, an attachment member articulated to the said toggle lever, a cable loop, ferrules fixedly attached to the ends of the said cable loop, the said attachment member having a plate portion and two upturned projections at the rear corners of the said plate portion embracing the said cable ends and engaging behind the said ferrules, and a safety plate detachably attached to the plate portion of the said attachment member and having slotted lugs engaging between the said upturned projections and the said attachment member and the said ferrules, the said lugs having their slots open towards the said plate portion.

ADOLF ATTENHOFER.

References Cited in the file of this patent

UNITED STATES PATENTS

| Number | Name | Date |
|---|---|---|
| 1,819,781 | Kreisler | Aug. 18, 1931 |
| 2,382,783 | Eigenheer | Aug. 14, 1945 |
| 2,406,607 | Jensen | Aug. 27, 1946 |

FOREIGN PATENTS

| Number | Country | Date |
|---|---|---|
| 74,965 | Norway | Apr. 19, 1949 |
| 166,249 | Switzerland | Mar. 1, 1934 |
| 239,164 | Switzerland | Dec. 17, 1945 |
| 265,540 | Switzerland | Mar. 1, 1950 |
| 882,479 | France | Mar. 1, 1943 |